United States Patent
Parekh

(10) Patent No.: US 10,552,117 B1
(45) Date of Patent: Feb. 4, 2020

(54) VEHICLE AUDIO SETTINGS MANAGEMENT

(71) Applicant: TOYOTA MOTOR NORTH AMERICA, INC., Plano, TX (US)

(72) Inventor: Devang Parekh, Dallas, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/156,870

(22) Filed: Oct. 10, 2018

(51) Int. Cl.
    *G06F 3/16*     (2006.01)
    *H04R 3/00*     (2006.01)
    *G10L 25/60*     (2013.01)
    *H04R 3/04*     (2006.01)

(52) U.S. Cl.
    CPC .............. *G06F 3/165* (2013.01); *G10L 25/60* (2013.01); *H04R 3/04* (2013.01); *H04R 2420/07* (2013.01); *H04R 2430/01* (2013.01); *H04R 2499/13* (2013.01)

(58) Field of Classification Search
    CPC . H04R 3/00; H04R 3/04; H04R 29/00; H04R 2499/13; H04R 2430/01; G06F 3/16; G06F 3/165; G10L 25/60
    See application file for complete search history.

(56) References Cited

U.S. PATENT DOCUMENTS

| | | | |
|---|---|---|---|
| 7,647,419 B2 | 1/2010 | Deshpande | |
| 7,767,896 B2 | 8/2010 | Kameyama | |
| 8,571,466 B2 | 10/2013 | Ingrassia, Jr. et al. | |
| 8,934,845 B2 | 1/2015 | Weng | |
| 9,071,892 B2 | 6/2015 | Gratke | |
| 9,693,139 B1 | 6/2017 | Teknos et al. | |
| 9,928,025 B2 | 3/2018 | MacNeille | |
| 2006/0046685 A1 | 3/2006 | Hjelmeland | |
| 2011/0087385 A1* | 4/2011 | Bowden | B60W 50/085 701/2 |
| 2015/0045988 A1* | 2/2015 | Gusikhin | B60R 16/037 701/2 |
| 2015/0180710 A1* | 6/2015 | Cazanas | H04L 41/082 709/221 |
| 2016/0077789 A1* | 3/2016 | Hampiholi | H04W 76/14 709/203 |
| 2017/0294183 A1* | 10/2017 | Teknos | G10K 11/178 |

(Continued)

FOREIGN PATENT DOCUMENTS

| | | |
|---|---|---|
| CN | 103384176 A | 11/2013 |
| CN | 105243066 A | 1/2016 |
| DE | 102011112628 A1 | 6/2012 |

(Continued)

*Primary Examiner* — Thang V Tran
(74) *Attorney, Agent, or Firm* — Haynes and Boone, LLP

(57) ABSTRACT

A method performed by a computing system includes receiving audio data from a plurality of vehicles. The audio data may include vehicle audio settings associated with a set of input parameters. The set of input parameters may include vehicle type. The method may further include analyzing the audio data to determine an audio setting trend for a subset of the plurality of vehicles. The method may further include transmitting to a destination vehicle, an audio setting profile based on the audio setting trend. The destination vehicle may be different than the plurality of vehicles. The destination vehicle may have at least one matching input parameter as the subset of the plurality of vehicles.

20 Claims, 4 Drawing Sheets

(56) References Cited

U.S. PATENT DOCUMENTS

2018/0165359 A1* 6/2018 Banvait .............. G06Q 30/0631

FOREIGN PATENT DOCUMENTS

| | | |
|---|---|---|
| EP | 691736 A1 | 5/1995 |
| KR | 20060003133 A | 1/2006 |
| KR | 1020160050416 A | 5/2016 |
| WO | 2012172394 A1 | 12/2012 |
| WO | 20150103019 A1 | 7/2015 |

* cited by examiner

| Data 104 | |
|---|---|
| Audio Settings 106 | Parameters 108 |
| Fade 202 | Vehicle type 212 |
| Balance 204 | Source 214 |
| Bass 206 | Genre 216 |
| Treble 208 | Quality 218 |
| Volume 210 | Occupancy 220 |

*FIG. 2*

VEHICLE AUDIO SETTINGS MANAGEMENT

FIELD OF THE DISCLOSURE

The present disclosure generally relates to systems for audio setting management, more particularly, to audio setting configuration of vehicles.

BACKGROUND

Vehicles typically come equipped with audio systems for playing audio presentations to the vehicle's occupants. Most vehicles allow a user to adjust the audio settings of a vehicle. For example, the driver or other vehicle occupant, may vary the relative volume at various frequency ranges, such as the bass or treble frequencies. The driver or other vehicle occupant may also adjust the staging. Specifically, the user may adjust the audio settings to put more volume to the front speakers versus the back, or more volume to the left speakers versus the right. The vehicle may also play audio presentations from a variety of sources. For example, a vehicle may play an audio presentation from the radio, a Bluetooth connection, or an auxiliary connection. It is desirable that the driver or other occupant have a good user experience with the vehicle's audio system.

SUMMARY

According to one example, a method performed by a computing system includes receiving audio data from a plurality of vehicles. The audio data may include vehicle audio settings associated with a set of input parameters. The set of input parameters may include vehicle type. The method may further include analyzing the audio data to determine an audio setting trend for a subset of the plurality of vehicles and transmitting to a destination vehicle, an audio setting profile based on the audio setting trend. The destination vehicle may be different than the plurality of vehicles. The destination vehicle may have at least one matching input parameter as the subset of the plurality of vehicles.

According to one example, a computing system associated with a vehicle includes a processor and a memory with machine-readable instructions that when executed by the processor, cause the system to: receive an audio setting profile from a server. The audio setting profile may define a plurality of audio settings based on varying input parameters. The audio setting profile may be based on historical audio setting data collected from a plurality of other vehicles. The system is further to adjust audio settings of the vehicle based on the audio setting profile and a current set of parameters for the vehicle.

According to one example, a method includes analyzing audio setting data from a plurality of vehicles to determine an audio setting trend for the plurality of vehicles. The plurality of vehicles may have a common set of input parameters. The method may further include transmitting to a vehicle, audio settings based on the audio setting trend. The vehicle may have matching input parameters as the plurality of vehicles.

Another aspect of the present disclosure provides a non-transitory computer-readable medium having stored thereon machine-readable instructions executable by a computing system to cause a machine to perform any of the methods described herein.

BRIEF DESCRIPTION OF THE DRAWINGS

FIG. 2 is a diagram showing illustrative audio data, according to one example of principles described herein.

DETAILED DESCRIPTION

Illustrative embodiments and related methods of the present disclosure are described below as they might be employed in a system and method for vehicle audio setting configuration. In the interest of clarity, not all features of an actual implementation or method are described in this specification. It will of course be appreciated that in the development of any such actual embodiment, numerous implementation-specific decisions may be made to achieve the developers' specific goals, such as compliance with system-related and business-related constraints, which will vary from one implementation to another. Moreover, it will be appreciated that such a development effort would be an achievable undertaking for those of ordinary skill in the art having the benefit of this disclosure. Further aspects and advantages of the various embodiments and related methods of the disclosure will become apparent from consideration of the following description and drawings.

As described above, it is desirable that the driver or other occupant have a good user experience with the vehicle's audio system. According to principles described herein, the audio settings for particular vehicle may be set based on audio trends determined from other vehicles. More specifically, the audio settings may be set based on audio trends from similar vehicles and for similar types of audio presentations.

To accomplish this, an audio setting processing system may collect audio data from several vehicles. The audio data may include audio settings such as bass level, treble level, fade, balance, and volume. The audio data may also include set of input parameters. The input parameters may include, for example, the vehicle type, the source of the audio presentation, the quality of the audio presentation, and the genre of the audio presentation. Using the collected audio data from multiple vehicles, a correlation process is performed where various trends may be determined for certain types of vehicles and certain types of audio presentations. Such trends may be used to create an audio setting profile for a particular vehicle. The audio setting profile may then be transmitted to that particular vehicle in order to configure that vehicles audio settings. The audio settings defined in the audio setting profile may then be implemented within the vehicle. Thus, when the user is listening to a particular genre from a particular source having a particular audio quality, the audio settings can be adjusted accordingly.

Figure 1:
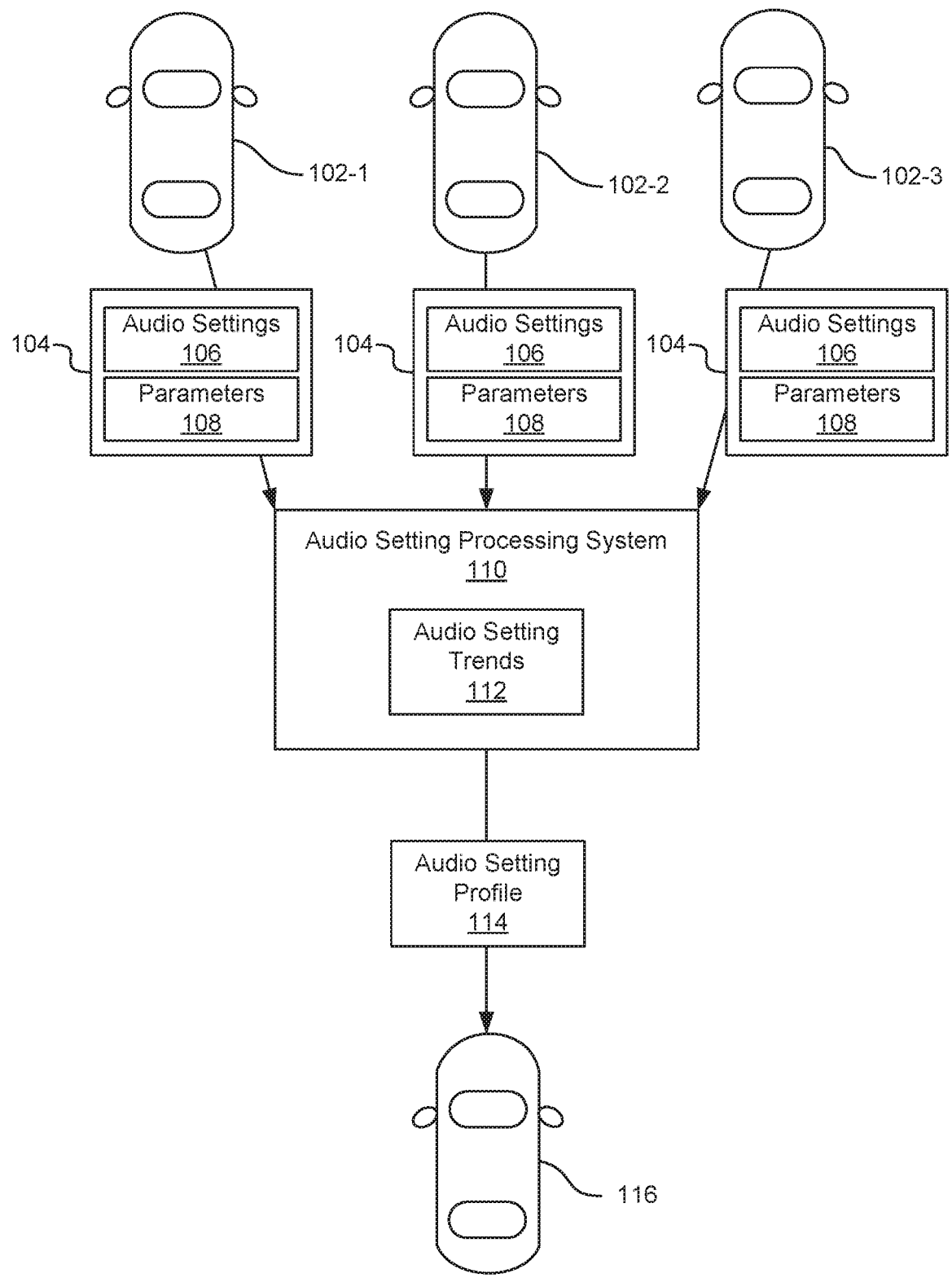
FIG. 1 is a diagram showing the configuration of a vehicle's audio settings based on audio trends determined from other vehicles, according to one example of principles described herein.

FIG. 1 is a diagram showing the configuration of a particular vehicle's audio settings based on audio trends determined from other vehicles. According to the present example, an audio setting processing system 110 collects audio data 104 from a plurality of vehicles 102-1, 102-2, 102-3. The audio data 104 includes audio settings 106 and input parameters 108. The audio setting processing system 110 then uses the audio data 104 to generate audio setting trends 112. The audio setting trends 112 may be used to create an audio setting profile 114 and transmit that audio setting profile 114 to a vehicle 116. The vehicle 116 may then use that audio setting profile 114 to configure its audio settings.

The vehicles 102-1, 102-2, 102-3 may be various types of vehicles. For example, the vehicles may be of a variety of makes and models. Alternatively, for greater correlation, vehicles 102-1, 102-2, 102-3 may be of the same type of make and model. While only three vehicles are illustrated, practical implementations of principles described herein may involve a significantly higher number of vehicles.

Each of the vehicles 102-1, 102-2, 102-3 may be equipped with an audio system. The audio system may be configurable by a user (e.g., the driver or other vehicle occupant). For example, the user may configure various frequency levels such as the bass, mid-range, and treble. In some examples further levels of granularity for the frequency ranges may be available. The user may also be able to configure the staging settings. For example, the user may be able to adjust the fade (differential between front and rear speakers) and the balance (differential between left and right speakers).

The vehicles 102-1, 102-2, 102-3 may also be equipped with mechanisms to record the user input related to the audio settings and transmit recorded data to the audio setting processing system 110. For example, the vehicle may have an integrated computing system that detects the audio settings and any adjustments made to the audio settings by the user. The vehicle may also include a network interface to transmit the data over a wireless connection such as a wi-fi or cellular connection. In some examples, the vehicle may also be able to interface over a hardwire connection. For example, when the vehicle is serviced, a technician may plug in to the vehicle's computing system and download the audio data. That audio data may then be sent to the audio setting processing system 110 over a network such as the Internet.

The audio setting processing system 110 may be embodied as one or more servers that collect audio data 104. The audio data 104 may then be stored in one or more databases. The audio data 104 may then be processed or analyzed to determine audio setting trends 112. Various processing mechanisms may be used to determine audio setting trends. In one example, machine learning functions may be used to derive the audio setting trends 112.

Machine learning involves a set of inputs and a set of outputs. A machine learning function then seeks to derive a rule that will map the inputs to the outputs. The audio setting processing system 110 may use the input parameters as the inputs to the machine learning function and use the audio settings as the outputs to the machine learning function. The machine learning function may then derive a general rule that maps the input parameters to the audio settings. Thus, for a particular vehicle, the derived general rule may be applied to that vehicle's input parameters (e.g., make and model) to create a set of outputs representing that vehicle's audio setting profile.

In some examples, audio setting trends determined by the audio setting processing system 110 may be specific to a particular input parameter. For example, an audio setting trend may be specific to a particular vehicle type (e.g., car, truck, make, and/or model) of vehicle. Thus, an audio setting profile for such an audio setting trend will be applicable to other vehicles of that type. For example, it may be the case that users of make A and model B tend to prefer higher bass levels. In another example, users of make C and model D tend to prefer to adjust the fade setting to increase the volume from rear speakers while decreasing the volume from front speakers.

In another example, audio setting trends may be specific to a combination of input parameters. For example, an audio setting trend may be specific to a particular genre of audio presentation from a particular source. For example, it may be the case that when people listen to genre A (e.g., rock music) over source B (e.g., Bluetooth), they prefer to have higher bass and higher treble levels, with lower mid-range levels. Or, it may be the case that when people listen to genre C (e.g., podcast) over source D (e.g., auxiliary connection) they prefer flat levels for bass, treble, and mid-range. Thus, audio setting profiles can be created accordingly.

The audio setting profile 114 may be specific to the vehicle type of vehicle 116. The audio setting profile 114 may define a variety of audio settings for a variety of conditions applicable to vehicle 116. The audio setting profile 114 may be transmitted to vehicle 116 in a manner that is similar to transmission of the audio data 104 from the vehicles 102-1, 102-2, 102-3 to the audio setting processing system 110. In other words, the audio setting profile 114 may be transmitted wirelessly over a wi-fi or cellular network. Or, the audio setting profile 114 may be downloaded to the vehicle 116 through a temporary hardwire connection.

In some examples, each of the vehicles 102-1, 102-2, 102-3 may have a matching input parameter with the vehicle 116. For example, the each of the vehicles 102-1, 102-2, 102-3 may be of the same type of vehicle as vehicle 116. Thus, when creating the audio setting profile 114 for vehicle 116, only audio data from vehicles having a matching type may be considered. However, in some examples, audio data from other types of vehicles may be considered as well.

By collecting audio data 104 in this manner, correlations and audio setting trends may be discovered for certain types of vehicles, certain types of music and other audio presentations, and certain types of audio quality. These audio trends and correlations can then be used to provide users with audio setting profiles that are more likely to be satisfactory and enjoyable for such users. And, such users may be able to spend less time adjusting the audio settings of the vehicle.

FIG. 2 is a diagram showing illustrative audio data 104. As described above, the audio data 104 includes audio settings 106 and parameters 108. In the present example, the audio settings 106 include fade 202, balance 204, bass 206, treble 208, and volume 210. Additionally, the parameters 108 include vehicle type 212, source 214, genre 216, quality 218, and occupancy 220. It is to be understood that the present disclosure is not limited to any particular type of audio data.

The fade 202 settings refer to the differential in volume between the front speakers in the vehicle and the rear speakers in the vehicle. For example, a user may adjust the fade 202 so that the front speakers play louder than the rear speakers. Conversely, a user may adjust the fade 202 so that the rear speakers play louder than the front speakers.

The balance 204 settings refer to the differential in volume between the left speakers of the vehicle and the right speakers in the vehicle. For example, a user may adjust the balance 204 so that the left speakers play louder than the right speakers. Conversely, a user may adjust the balance 204 so that the right speakers play louder than the left speakers. Audio setting trends may indicate that drivers of certain types of vehicles or certain genres of music prefer certain the fade or balance settings a certain way.

The bass 206 settings refer to the relative volume level of the lower frequencies in an audio presentation. In one example, the bass frequencies may range from about 60-250 Hz. Thus, if a user turns the bass up, then the frequencies of the audio presentation within that range may play more loudly relative to frequencies outside that range. Audio setting trends may indicate that drivers of certain types of vehicles or listeners of certain genres of music prefer certain bass levels.

The treble 208 settings refer to the relative volume level of the higher frequencies and an audio presentation. In one example, the treble frequencies may range from about 2-4 kHz. Thus, if a user turns the treble up, then frequencies of the audio presentation within that range may be more loudly relative to frequencies outside that range. While the present example illustrates only bass and treble ranges, systems with more granularity are contemplated. For example, there may be a midrange setting (e.g., 500 Hz to 2 Khz) or a lower midrange setting (e.g., 250-500 Hz). Audio setting trends may indicate that drivers of certain types of vehicles or listeners of certain genres of music prefer certain treble levels.

The volume 210 settings refer to the overall loudness (e.g., dB) of the audio presentation. Audio setting trends may indicate that drivers of certain types of vehicles, or listeners of certain genres of music, may prefer certain volume settings.

The vehicle type 212 may refer to the make and model of the vehicle. In some examples, the vehicle type 212 may also refer to the trim vehicle. Audio setting trends may indicate the drivers of different types of vehicles have different preferences for audio settings. The vehicle type 212 may be defined in various ways. For example, the vehicle may be defined as a sedan, coupe, truck, van, a Sport Utility Vehicle (SUV). The vehicle type 212 may also include gas powered or electric powered cars, as the acoustics in such cars may be different. Specifically, in some cases the cabin of an electric vehicle may be quieter than the cabin of a gas-powered vehicle.

The source 214 refers to the source of an audio presentation. Examples of sources may include Frequency Modulation (FM) radio, Amplitude Modulation (AM) radio, a Bluetooth connection, a Compact Disc (CD), a Universal Serial Bus (USB) connection, or an auxiliary cable connection. Audio setting trends may indicate that users prefer different audio settings when listening to content from different sources.

The genre 216 may refer to the type of audio presentation. In one example, the audio presentation may be a voice presentation such as a podcast or recorded book. In some examples, the audio presentation may be music. When the audio presentation is music, different genres of music may be considered. Audio settings trends may indicate that users prefer listening to certain genres of music with certain audio settings. Audio trends may also indicate that users prefer different audio settings when listening to music versus a voice presentation.

The quality 218 may refer to the quality of the audio. For example, various radio stations may be received at varying quality levels. To some extent, adjustment of the audio settings may help manage a lower quality reception. Thus, audio setting trends may indicate that sources at certain quality metrics may be improved with certain adjustments to the audio settings. In addition, it can be determined at what quality metric a user is likely to give up on a radio station and switch to another.

The occupancy 220 refers to the number of persons in a vehicle. This may be determined, for example, by seat pressure sensors. Audio trends may indicate that drivers prefer different audio settings when driving alone versus driving with others in the vehicle. For example, a driver may prefer to listen to music at a higher volume when driving alone versus when driving with other people.

Figure 3:
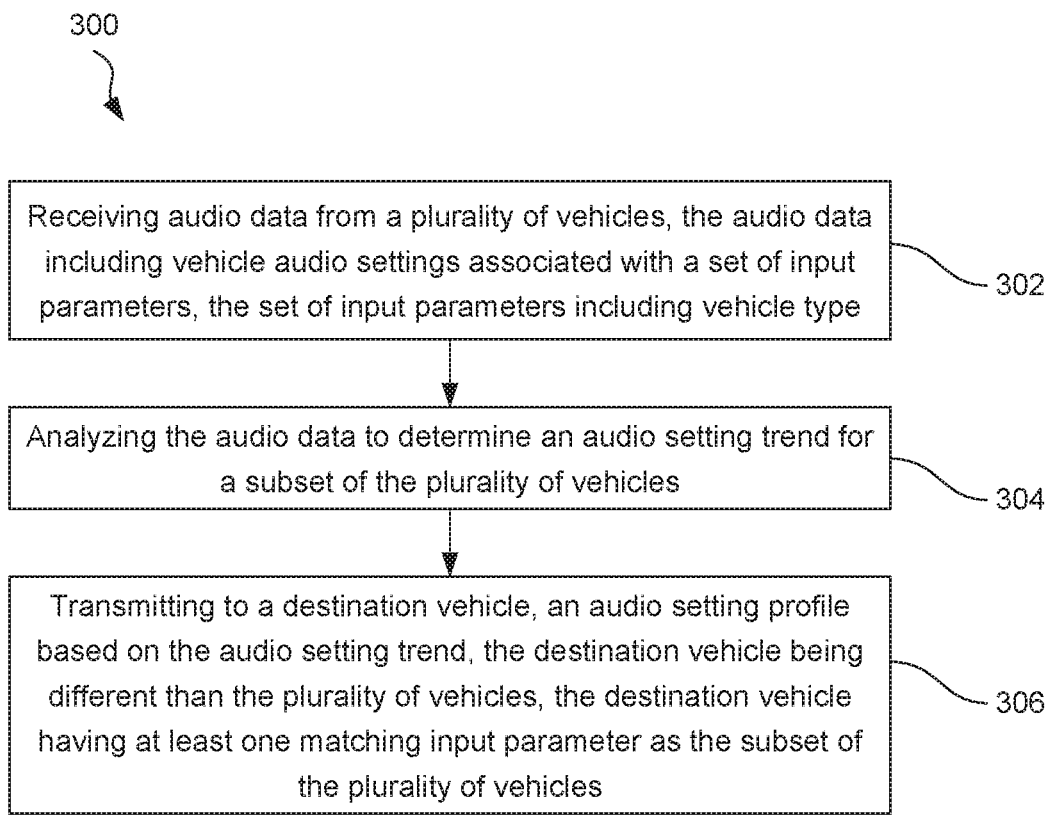
FIG. 3 is a flowchart showing illustrative method for configuring vehicle audio settings based on audio trends determined from other vehicles, according to one example of principles described herein.

FIG. 3 is a flowchart showing illustrative method 300 for configuring vehicle audio settings based on audio trends determined from other vehicles. According to the present example, the method 300 includes a step 302 for receiving audio data from a plurality of vehicles. The audio data may include vehicle audio settings associated with a set of input parameters. As described above, the vehicle audio settings may include, for example, bass, treble, fade, balance, and volume. The set of input parameters may include vehicle type, a quality metric for an audio presentation, a source of the audio presentation, a genre of the audio presentation, and the occupancy of the vehicle. The audio data may be received over a wireless network or a hardwire connection to the vehicle.

The method 300 further includes a step 304 for analyzing the audio data (e.g., using a correlation process on audio data from the plurality of vehicles) to determine an audio setting trend for a subset of the plurality of vehicles. This may be done, for example, by an audio setting processing system (e.g., 110, FIG. 1), which may be embodied as one or more servers. The audio setting trend may be stored on a database and used to derive an audio setting profile for a vehicle of similar type. The audio setting profile may define audio settings for a variety of circumstances associated with the input parameters.

The method 300 further includes a step 306 for transmitting to a destination vehicle (e.g., 116, FIG. 1), an audio setting profile (e.g., 114, FIG. 1) based on the audio setting trend. The destination vehicle may be different than the plurality of vehicles. In other words, the destination vehicle may not be one of the vehicles that provides audio data to the audio setting processing system to determine the audio trends. However, in some examples, the destination vehicle may also transmit audio data to the audio setting processing system and the transmitted data may be used in the analyzing step 304. The destination vehicle may have at least one matching input parameter as the subset of the plurality of vehicles. For example, the destination vehicle may be the same make and model as the vehicles in the subset of the plurality of vehicles.

The destination vehicle may then implement the audio setting processing system. As some parameters change, the vehicle may adjust the audio settings of the first vehicle. For example, if the user selects a different source for an audio presentation, the audio settings may be adjusted according to the audio setting profile. If the user selects a different genre of music, the audio settings may be adjusted according to the audio setting profile.

Figure 4:
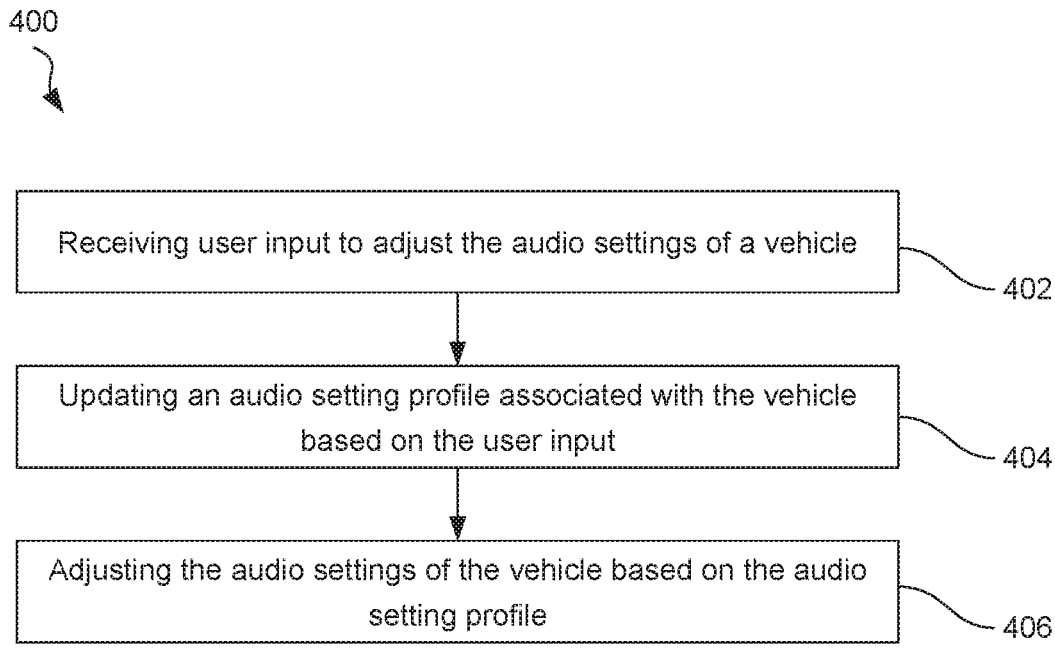
FIG. 4 is a flowchart showing an illustrative method for updating a vehicle's audio settings based on historical audio data for that vehicle, according to one example of principles described herein.

FIG. 4 is a flowchart showing an illustrative method 400 for updating a vehicle's audio settings based on historical audio data for that vehicle. According to the present example, the method 400 includes a step 402 for, receiving user input to adjust the audio settings of the destination vehicle. For example, the user may change the audio source to Bluetooth, and also make some adjustments to the audio settings. The vehicle's computing system may record this change and other similar changes. Over time, the vehicle's computing system may detect trends based on the user inputs to the audio settings.

The method 400 further includes a step 404 for updating an audio setting profile associated with the vehicle based on the user input. While an audio setting profile transmitted to a vehicle may be useful based on data analytics for similar vehicles and similar parameters of an audio presentation, it may not apply fully to a particular user of a particular vehicle. Thus, as the user makes adjustments to the audio settings when listening to various types of audio presentations from various sources, the vehicle's computing system can record these changes and update the audio setting profile specific to that vehicle accordingly.

The method further includes a step 406 for adjusting the audio settings of the first vehicle based on the audio setting profile. For example, if the user switches to a particular audio source, the vehicle's computing system may check the audio setting profile to adjust the audio settings of the vehicle accordingly.

In some examples, when the user makes an adjustment to the audio settings, the vehicle's computing system may refrain from updating the audio setting profile if a predetermined condition is present. For example, the vehicle's computing system may detect, using seat sensors, that other persons are the vehicle. Thus, it is possible that the user may be adjusting the vehicle audio settings for the benefit of other occupants rather than the driver alone. Thus, such adjustments can be ignored so as to not affect the audio setting profile.

Figure 5:
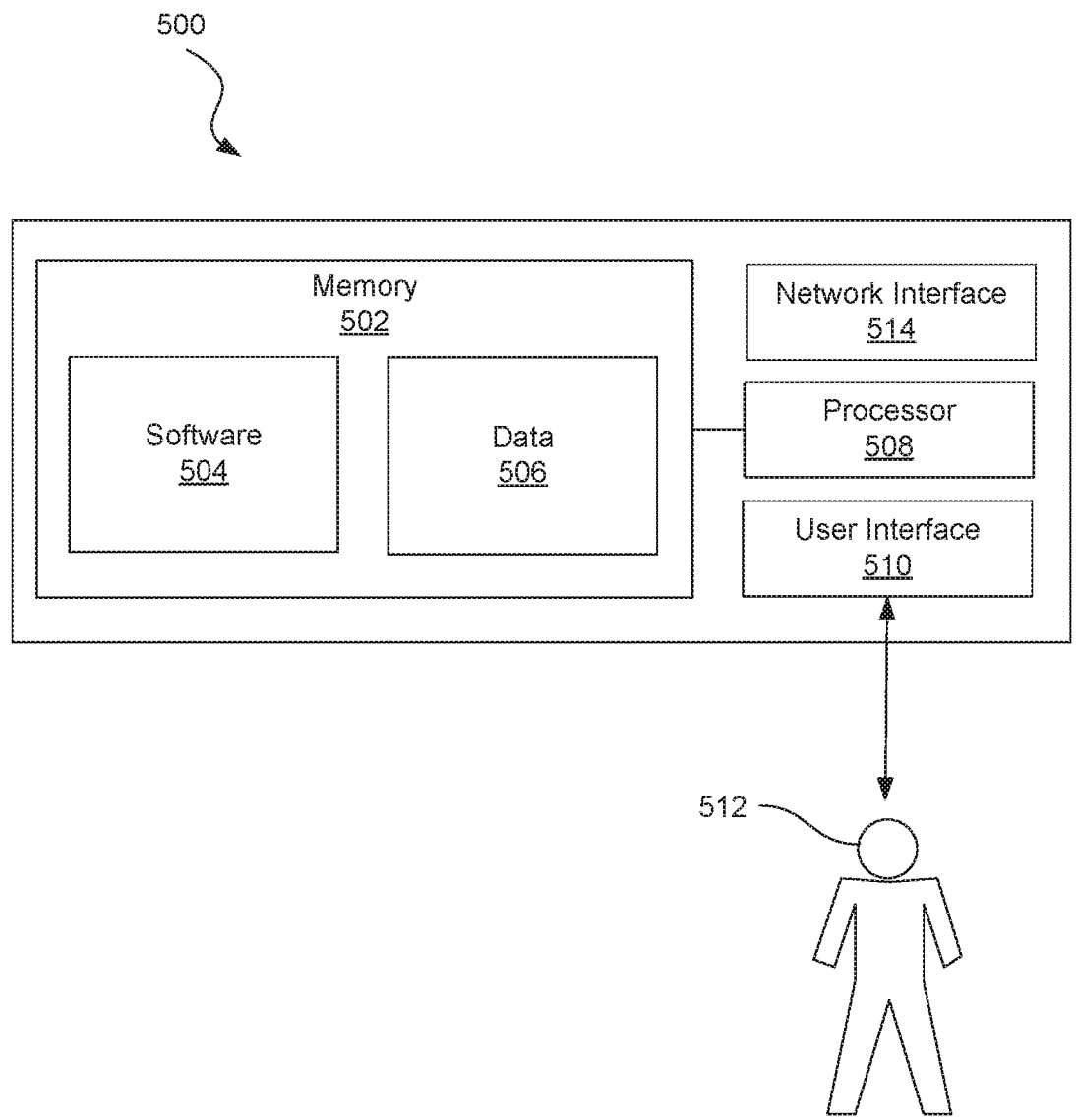
FIG. 5 is a diagram showing an illustrative computing system that can be used for audio setting management, according to one example of principles described herein.

FIG. 5 is a diagram showing an illustrative computing system that can be used for audio setting management. In one example, the computing system may be, for example, a server associated with the audio setting processing system 110. In one example, the computing system may be, for example, an on-board vehicle computing system. According to certain illustrative examples, the physical computing system 500 includes a memory 502 having software 504 and data 506 stored thereon. The physical computing system 500 also includes a processor 508 and a user interface 510.

There are many types of memory available. Some types of memory, such as solid-state drives, are designed for storage. These types of memory typically have large storage volume but relatively slow performance Other types of memory, such as those used for Random Access Memory (RAM), are optimized for speed and are often referred to as "working memory." The various forms of memory may store information in the form of software 504 and data 506. The software 504 may include machine readable instructions for performing the processes described herein, such as the processes 300 or 400.

The physical computing system 500 also includes a processor 508 for executing the software 504 and using or updating the data 506 stored in memory 502. In addition to storing the software 504, the memory 502 may store an operating system. An operating system allows other applications to interact properly with the hardware of the physical computing system.

In the example where the physical computing system 500 corresponds to a server associated with the audio setting processing system 110, the software 504 may include functions for receiving audio data. That audio data may be received over a network, part of which includes wireless connections to multiple vehicles. The software 504 may include various functions for analyzing the audio data and determining trends. The software 504 may also include various functions for creating audio setting profiles for specific vehicles based on the trend.

In the example where the physical computing system 500 corresponds to an on-board vehicle computing system, the software 504 may include functions for receiving an audio setting profile. The audio setting profile may be received over a wireless network or a hardwired connection. The software 504 may also include functions for implementing the audio setting profile within the vehicle. The software 504 may also include functions for monitoring user input to adjust the audio settings and record those audio settings as well as associated parameters. The software 504 may also include functions for transmitting audio data to the audio setting processing system.

A user interface 510 may provide a means for a user 512 to interact with the system. The user 512 may use various tools such as a touchscreen or physical buttons on the vehicle console to input information into the physical computing system. Additionally, various output devices such as a touchscreen or other display may be used to provide information to the user 512.

The physical computing system 500 further includes a network interface 514. The network interface 514 allows the computing system to communicate with other computing system. In the example where the physical computing system 500 corresponds to the audio setting processing system 110, the network interface 514 may be a hardwire network interface such as Ethernet or fiber optic. The network interface 514 may also be a wireless network interface. In the example where the physical computing system 500 corresponds to an on-board vehicle computing system, the network interface 514 may be for a cellular connection or a wi-fi connection to a user's home wi-fi network.

Although various embodiments and methods have been shown and described, the disclosure is not limited to such embodiments and methods and will be understood to include all modifications and variations as would be apparent to one skilled in the art. Therefore, it should be understood that embodiments of the disclosure are not intended to be limited to the particular forms disclosed. Rather, the intention is to cover all modifications, equivalents and alternatives falling within the spirit and scope of the disclosure as defined by the appended claims.

What is claimed is:

1. A method performed by a computing system, the method comprising:
   receiving audio data from a plurality of vehicles, the audio data including vehicle audio settings associated with a set of input parameters, the set of input parameters including vehicle type;
   analyzing the audio data;
   determining an audio setting trend for a subset of the plurality of vehicles based on the analyzing of the audio data; and
   transmitting to a destination vehicle, an audio setting profile based on the determining of the audio setting trend, the destination vehicle being different than the plurality of vehicles, the destination vehicle having at least one matching input parameter as the subset of the plurality of vehicles.

2. The method of claim 1, wherein the set of input parameters further include a quality of an audio presentation.

3. The method of claim 1, wherein the set of input parameters further include a source of an audio presentation.

4. The method of claim 3, wherein the source of the audio presentation comprises one of: a radio signal, a Bluetooth connection, and an auxiliary connection.

5. The method of claim 1, wherein the set of input parameters further includes a genre of an audio presentation.

6. The method of claim 1, wherein the vehicle audio settings include frequency settings, the frequency settings including bass level and treble level settings.

7. The method of claim 1, wherein the vehicle audio settings include staging settings, the staging settings including fade and balance settings.

8. The method of claim 1, further comprising, adjusting the audio settings of the destination vehicle in response to detecting a change in the set of input parameters.

9. A computing system associated with a vehicle, the computing system comprising:
a processor; and
a memory with machine-readable instructions that when executed by the processor, cause the system to:
receive an audio setting profile from a server, the audio setting profile defining a plurality of audio settings based on varying input parameters, the audio setting profile based on historical audio setting data collected from a plurality of other vehicles; and
adjust audio settings of the vehicle based on the audio setting profile and a current set of parameters for the vehicle.

10. The system of claim 9, wherein the current set of parameters includes a quality of an audio presentation currently playing in the vehicle.

11. The system of claim 10, wherein the system is further to transmit to the server, received user inputs to the audio settings.

12. The system of claim 10, wherein the computing system is configured to receive the audio setting profile over a wireless connection.

13. The system of claim 10, wherein the computing system is configured to receive the audio setting profile over a hardwire connection to the vehicle.

14. The system of claim 9, wherein the system is further to:
receive user input to adjust the audio settings of the vehicle; and
update an audio setting profile associated with the vehicle based on the user input.

15. The system of claim 14, wherein the system is further to adjust the audio settings of the vehicle based on the audio setting profile.

16. The system of claim 15, wherein the system is further to refrain from updating the audio setting profile if a predetermined condition is present.

17. The system of claim 16, wherein the predetermined condition is a determination that other occupants are in the vehicle.

18. A method comprising:
analyzing audio setting data from a plurality of vehicles;
determining an audio setting trend for the plurality of vehicles based on the analyzing the audio setting data, the plurality of vehicles having a common set of input parameters; and
transmitting to a vehicle, audio settings based on determining of the audio setting trend, the vehicle having matching input parameters as the plurality of vehicles.

19. The method of claim 18, wherein the set input parameters include at least one of: audio presentation source, audio presentation genre, audio presentation quality, vehicle model, and vehicle occupancy.

20. The method of claim 18, wherein the audio settings include at least one of: bass settings, treble settings, fade settings, balance settings, and volume settings.

* * * * *